(No Model.)
J. H. HUNTRESS.
POLE FOR SUPPORTING ELECTRIC WIRES.
No. 471,759. Patented Mar. 29, 1892.
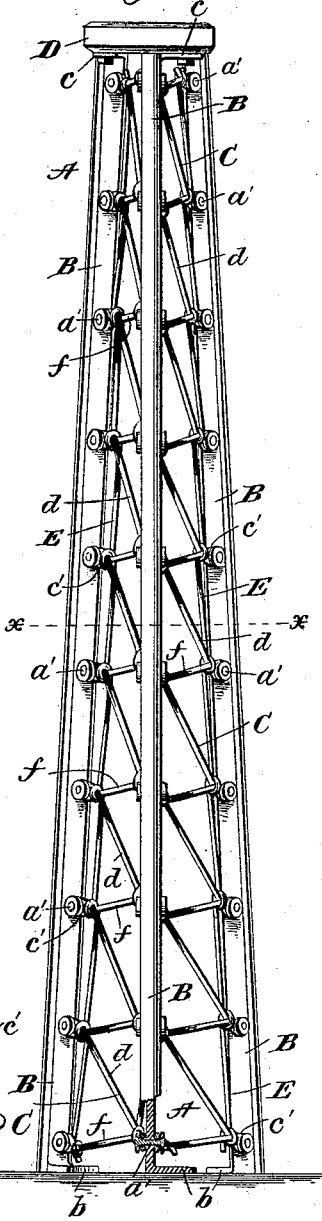
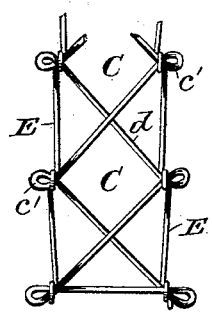
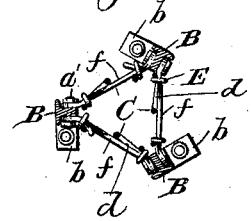
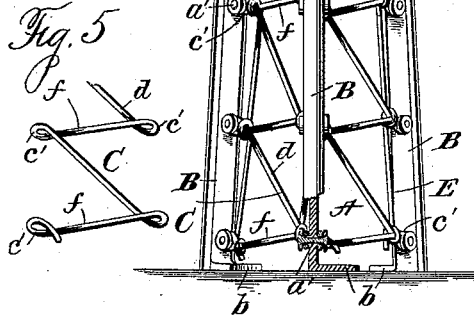
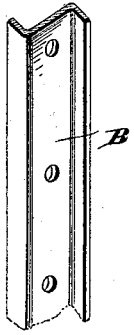
Witnesses:
Jas. E. Hutchinson.
G. F. Downing.
Inventor:
J. H. Huntress
By H. A. Seymour
Attorney.

UNITED STATES PATENT OFFICE.

JOHN H. HUNTRESS, OF JANESVILLE, WISCONSIN.

POLE FOR SUPPORTING ELECTRIC WIRES.

SPECIFICATION forming part of Letters Patent No. 471,759, dated March 29, 1892.

Application filed October 24, 1891. Serial No. 409,742. (No model.)

*To all whom it may concern:*

Be it known that I, JOHN H. HUNTRESS, a citizen of the United States, residing at Janesville, in the county of Rock and State of Wisconsin, have invented certain new and useful Improvements in Poles for Supporting Electric Wires; and I do hereby declare the following to be a full, clear, and exact description of the invention, such as will enable others skilled in the art to which it appertains to make and use the same.

My invention relates to an improvement in metal posts or poles, the object being to provide a cheap, simple, and durable device suitable and desirable for telegraph, telephone, and electric-light poles, windmill-towers, and like uses where a light, strong, and rigid post, pole, or tower is required.

A further object is to produce a post or pole adaptable for the support of electric wires, said post or pole being constructed in such manner that its structure will produce a series of steps whereby a lineman or other person can readily climb the post or pole.

With these objects in view the invention consists in certain novel features of construction and combinations and arrangements of parts, as hereinafter set forth, and pointed out in the claims.

In the accompanying drawings, Figure 1 is a view of my improved post or pole. Fig. 2 is a sectional view on line $x\,x$ of Fig. 1. Figs. 3 and 4 are views of modifications. Fig. 5 is a detail view.

A represents the post, pole, or tower, and is shown in the drawings as having three sides, although it may be made of any desired shape in cross-section. The corner-pieces B of the pole are made of stout strips of metal, and are provided at intervals with perforations for the reception of a series of rivets or bolts $a'$, to which the sides C of the pole are secured, as hereinafter explained. The lower ends of the corner-pieces are bent at right angles to produce arms $b$, whereby the post may be secured to the ground. The upper ends of said corner-pieces are also bent at right angles to produce arms $c$, to which a cross bar or arm D is secured for the attachment and support of electric wires or for other purpose. The corner-pieces B may be bent laterally at their edges, as shown in Fig. 4, to increase their rigidity, or they may be provided with lateral flanges, as shown in Fig. 1. Each side C of the post is composed of a single strand of stout wire $d$ and two brace-wires E E, and said sides are so constructed that they will be narrower at their tops than at their bottoms, whereby the post will be made smaller at the top than at the bottom. Starting from the lower rivet or bolt $a'$ of one corner-piece the wire $d$ is extended to the lower rivet or bolt of the adjacent corner-piece and passed around it, thus forming a loop $c'$. The wire is then extended diagonally to the second rivet or bolt $a'$ of the first-mentioned corner-piece and another loop $c'$ is formed, the wire then passing in a horizontal direction to the second rivet or bolt $a'$ of the second corner-piece and another loop $c'$ formed. The wire is thus looped over the several rivets or bolts $a'$ to the top of the post. The other sides of the post are formed in like manner, each rivet or bolt $a'$ (in a triangular post) serving to support two loops $c'$, one at each side of the corner-piece B. In order to brace the post and prevent the disengagement of the loops $c'$ from the rivets or bolts $a'$, the brace-wires E are employed. Starting from the base of the post, the brace-wires E are looped around the wires $d$ in close proximity to the loops $c'$ and the wires E extended to the top of the post and looped around the wire $d$ at each loop $c'$. It will be seen from the construction of the sides C, as above explained, that the horizontal portions $f$ of the wire $d$ constitute steps, whereby a lineman or other person may climb the post to repair the electric wires supported thereon or for other purpose.

Instead of the form of slides above described, that shown in Fig. 3 may be adopted. In this form the parts of the wire $d$ between the corner-pieces are diagonally disposed after forming each loop $c'$, the points of crossing in this case constituting the steps.

A post thus constructed is very simple, light, and effectual in the performance of its functions. It may be easily and cheaply constructed and readily placed in position.

Having fully described my invention, what I claim as new, and desire to secure by Letters Patent, is—.

1. In a post, the combination, with a series of corner-pieces, of sides secured thereto composed of wire, substantially as set forth.

2. The combination, with a series of corner-pieces, of sides composed of wire connecting these corner-pieces, and brace-wires, substantially as set forth.

3. The combination, with a series of corner-pieces and rivets or bolts projecting through said corner-pieces, of sides composed of wire connecting said corner-pieces, said wire being bent to produce loops to encircle said rivets, and wire braces looped around the wire constituting the sides in proximity to the loops in the wire composing the sides of the posts, substantially as set forth.

4. The combination, with a series of corner-pieces, of wire sides secured to and connecting said corner-pieces, said wire being bent to produce steps, substantially as set forth.

5. The combination, with a series of corner-pieces, arms or projections at their lower ends, whereby to secure them to the ground, and arms or projections at the upper ends of said corner-pieces for the reception of a cross bar or arm, of sides connecting said corner-pieces, said sides being composed of wire, substantially as set forth.

In testimony whereof I have signed this specification in the presence of two subscribing witnesses.

JOHN H. HUNTRESS.

Witnesses:
JOHN W. SULE,
E. D. McGOWAN.